Aug. 21, 1951   W. A. HUBER ET AL   2,564,694
RECEIVER CHANNEL SWITCH FOR OBJECT LOCATORS
Filed March 12, 1943   4 Sheets-Sheet 1

INVENTOR
WILLIAM A. HUBER
WILLIAM T. POPE JR.
BY
ATTORNEY

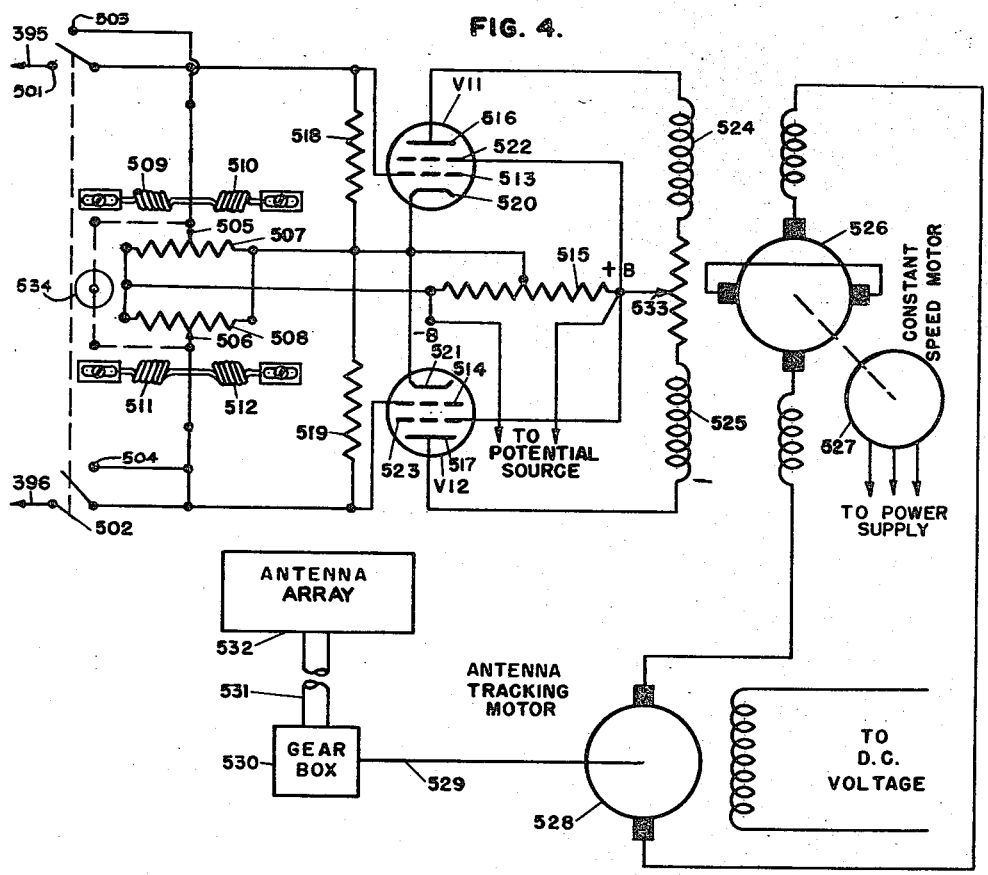
RANGE OSCILLOSCOPE SCREEN
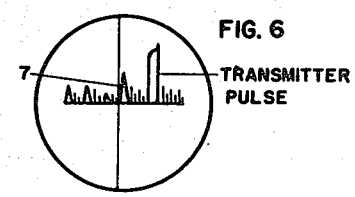
AZIMUTH OR ELEVATION OSCILLOSCOPE SCREEN.
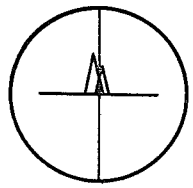
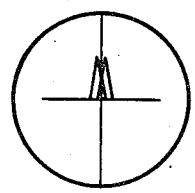
INVENTORS
WILLIAM A. HUBER
WILLIAM T. POPE JR.
BY *William D. Hall.*
ATTORNEY Patented Aug. 21, 1951

2,564,694

UNITED STATES PATENT OFFICE 2,564,694

RECEIVER CHANNEL SWITCH FOR OBJECT LOCATORS

William A. Huber, Neptune City, and William T. Pope, Jr., Asbury Park, N. J., assignors to the United States of America as represented by the Secretary of War Application March 12, 1943, Serial No. 478,862

5 Claims. (Cl. 343—5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a radio pulse-echo object-detecting system.

In systems of this type, a pulse of radio-frequency energy is radiated by a highly directional antenna. If the transmitted waves strike an object capable of reradiating these waves they will be reflected in part back to their source by this object. This echo pulse on its return to its source has sufficient energy to produce an observable effect in a suitable receiver located in the vicinity of the original source of these pulses. Generally the effect consists of visual indications on a cathode-ray oscilloscope in a form of vertical peaks projecting upward from a horizontal base line. These visual indications, together with the positioning of antennae, are utilized for determining the location of the object.

A complete reliance by the operators of the radio systems of this type on the visual indications produced on the oscilloscope screen alone is not free of disadvantages. The vertical peaks produced by the echo signals may vary in their amplitude from one instant to another, because of the fluctuations in the intensity of the reflected signal, interference signals which may add to or subtract from the echo signals because of variations in the transmission medium, and because of other causes which need not be discussed here. Moreover, the signal pattern as it actually appears on the oscilloscope screen generally includes a large number of echo signals proper as well as a multitude of pulsating signals, commonly called "noise" or "grass." Another factor which must be considered relates to the illumination generally found on the oscilloscope screen. This illumination is low if compared with daylight, and when the equipment is used in the daytime there is a very marked contrast in light intensities between the oscilloscope screen and bright surroundings. This contrast sometimes produces a temporary blindness among operators due to quick changes from light to dark and vice versa.

The operating conditions outlined above make it very desirable that the systems of this type provide some additional indicating instrument which would track a single selected echo only, and would also be devoid of the disadvantages inherent in any oscilloscope system. Moreover, the operator's duties may be rendered even less burdensome and the accuracy of the entire system considerably improved if the circuits of this single echo meter tracker are so constructed that they can perform a dual function: to provide an indication of the degree and direction of antenna deflection from a single echo signal selected by the operator on the oscilloscope screen, and secondly, to provide sufficient power of right polarity for automatic antenna tracking of the selected echo.

One object of this invention, therefore, is to provide a new meter-tracker for the radio pulse-echo object-detecting systems which gives the operator an even flow of data on the relative position of the single echo-producing object.

Another object of this invention is to provide motor driven equipment for automatic antenna tracking of that single object which is selected by the operator from a plurality of echoes appearing on the oscilloscope screen.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawings:

Fig. 4 is a schematic circuit diagram of the automatic antenna tracker;

Figs. 5 to 8 show the oscilloscope screens as they appear at various stages of the operating cycle of the system.

Receiver

Figure 1:
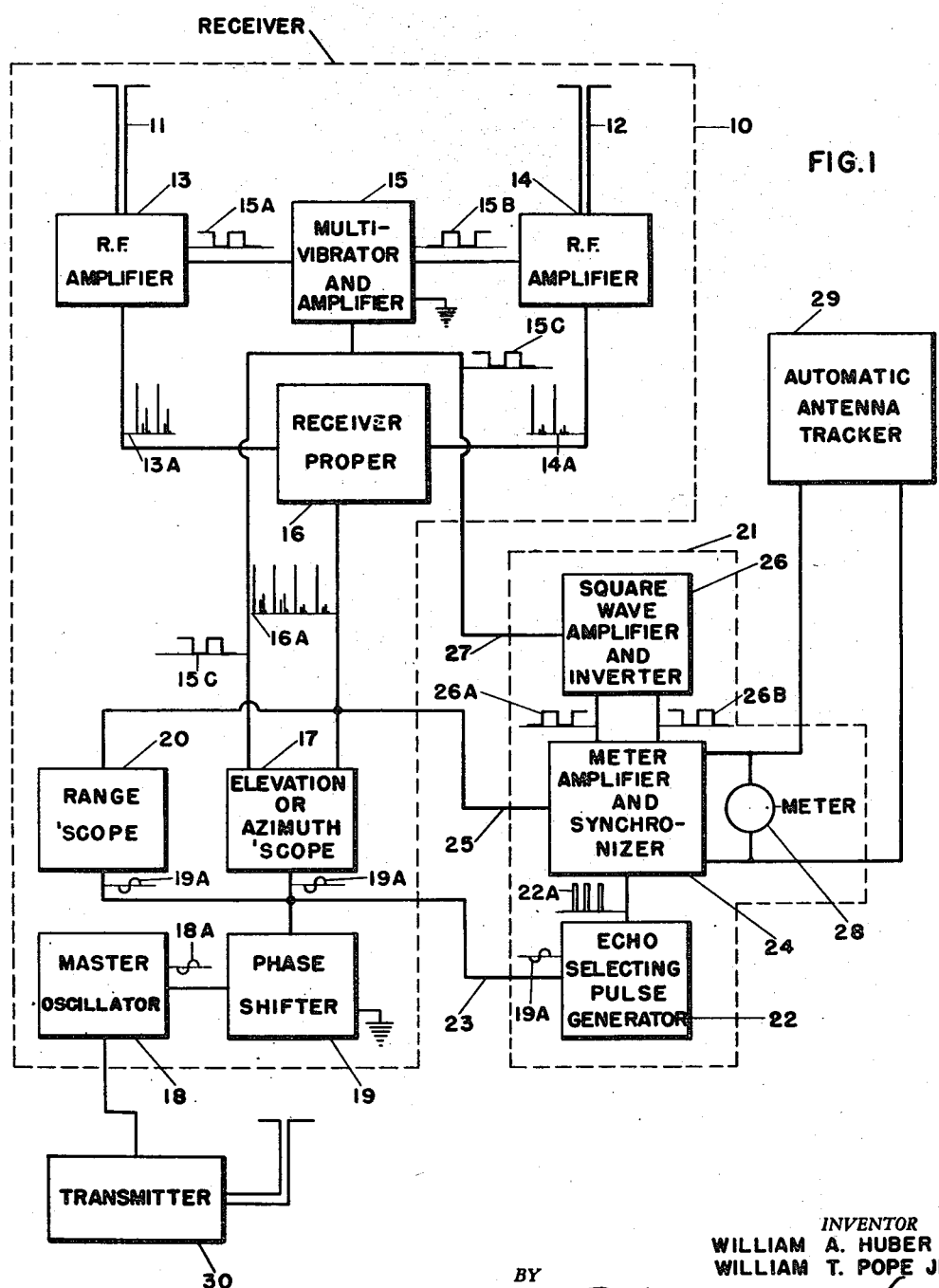
Fig. 1 is a block diagram of the receiver of the radio pulse-echo detecting system provided with our meter tracker and automatic tracker.

Referring to Fig. 1, it shows one type of echo detecting system for which our meter and automatic tracking equipment is particularly adapted. As shown in the figure, a receiver 10 is connected to a directional antenna array 11—12 which has a plurality of divergent, partially overlapping reception patterns, so that the intensity of signal in the channels 13—14 is equal when the array is parallel to the wave front of the reflected signal, and unequal when there is a departure from the above parallelism. The antenna arrays of this type are known, and do not form a part of our invention; therefore, their description need not be given here. It should be stated, however, that our invention is not restricted to any particular antenna system, and will function with any type of directional antenna system which has at least two divergent, partially overlapping reception patterns capable of producing two signals of equal or unequal intensity depending upon the orientation of the system with respect to the plane of the incoming signal wave front. This signal detecting system may be used either in determining azimuth or elevation of the object; as the two systems for determining these vectors are identical, only one of them is illustrated in Fig. 1. These systems are known in the art as double-tracking systems.

One part of antenna signal is impressed on a radio-frequency amplifier 13, and another part of antenna signal is impressed on a complementary radio-frequency amplifier 14, the two amplifiers forming two parallel channels of the receiver. The signals in these radio frequency channels will be composed of the main transmitted pulse, one or more echo signals, if there are any echo-producing objects within the antenna patterns, and of interference signals. This is illustrated in Fig. 5 which shows a range oscilloscope screen with a typical signal pattern as it appears on the screen. As stated above, the amplitude of the echo signals in these channels may or may not be equal, and this amplitude difference is utilized as a guide for proper orientation of the antenna array.

A typical single-echo signal pattern on the elevation or azimuth oscilloscope screens is shown in Figs. 7 and 8. Normally all signals appearing on the screen of the range oscilloscope also appear on the oscilloscope screens of the azimuth and the elevation channels; for the sake of simplicity only one selected echo signal is shown in Figs. 7 and 8. Fig. 7 shows the signal pattern when the images have unequal intensities, and Fig. 8 shows the same images when they are made equal by pointing the antenna arrays directly at the echo-producing object.

To produce these two independent images of the same echo signal on the screen of an oscilloscope 17, the amplifiers 13 and 14 are keyed by a multivibrator 15 which generates two square waves 15—A and 15—B of the same frequency but 180° out of phase. These square waves key the amplifiers 13 and 14, and make them alternately conductive and non-conductive. The output signals of these amplifiers are shown at 13—A and 14—A, the highest peaks indicating the transmitted pulse, and the smaller peaks indicating the echoes. The receiver proper 16 is connected to the amplifiers 13—14 on its input side and to the oscilloscopes 17 and 20 on its output side. The oscilloscope 17 may either be an azimuth or an elevation oscilloscope depending upon whether the antennae 11—12 are azimuth or elevation antennae. The signals as they appear on the output side of receiver are shown at 16—A; they consist of a series of signals first from one R. F. channel and then the other R. F. channel. The sweep voltage of oscilloscope 17 is under combined control of a master oscillator 18 and a phase shifter 19 on one side, and a square wave 15—C generated by the multivibrator. Since the master oscillator is used for keying the transmitter 30, the sweep circuits of the oscilloscopes 17 and 20 are in constant synchronism with the transmitted pulses. The square wave 15—C is in phase with square wave 15—A, and is utilized in the sweep circuit of oscilloscope 17 for a lateral shifting of the cathode-ray beam in synchronism with the keying of two R. F. channels. Accordingly, the signals shown at 16—A appear as two laterally displaced images on the screen of oscilloscopes 17 (see Figs. 7 and 8), the degree of lateral displacement being controlled by varying the amplitude of square wave 15—C.

A range oscilloscope 20 is connected to the output of receiver 16 and to phase shifter 19. Since this oscilloscope is not connected to multivibrator 15, its sweep circuit is controlled only by master oscillator 18, and, as a consequence, there is no lateral displacement of the signals coming from channels 13 and 14, but they appear as a single retraced signal when the antennae are pointed directly at the object. This is shown in Figs. 5 and 6. When antenna is not pointed at the object, then the two signals appear in phase, but have different amplitudes.

The operation of the receiver is, briefly, as follows: If there is a plurality of echo-producing objects within the antennae field, their echoes will appear on the range, azimuth, and elevation oscilloscopes as a plurality of peaked signals. To determine the distance to any one of these objects, the range oscilloscope operator revolves a hand wheel of the phase shifter 19 until the selected echo signal appears with its left edge under the hair line of the range oscilloscope 20, as shown in Figs. 5 and 6, where Fig. 5 shows the relative position of the signals with respect to the hair line before any echo signal has been selected, and Fig. 6 shows the same signals but with the echo signal 7 selected by the range oscilloscope operator. The phase shifter has a correctly calibrated dial which gives a range distance. Operation of the phase shifter 19 also shifts the echo signals on the screen of the elevation and the azimuth oscilloscopes (only one is shown in Fig. 1), and positions the echo signal selected by the range unit operator in the center of the screens of these oscilloscopes as shown in Figs. 7 and 8. The operators of the azimuth and elevation oscilloscopes operate the hand wheels which point their antenna systems directly at the object. This proper orientation of the antennae equalizes the amplitudes of the split-echo images on the oscilloscope screens as shown in Fig. 8, and furnishes the necessary angles for locating the object.

*Meter circuit*

The general characteristics of our meter circuit are such that its output will be zero when the antennae are properly oriented with respect to the echo-producing object, and it will produce a proportional voltage signal of one polarity when an echo signal is stronger in the R. F. amplifier 13 than in the R. F. amplifier 14, and vice versa. Only one echo signal, selected by the range oscilloscope operator, can have any effect on our meter circuit, the remaining echo signals as well as the transmitted signal being all suppressed by the echo-selecting circuit.

Referring again to Fig. 1, the meter circuit 21 consists of an echo-selecting pulse generator 22, a square wave amplifier and inverter 26, both of which are connected to a meter amplifier and synchronizer 24. The output of the meter synchronizer 24 is connected to a meter 28 and an automatic antenna tracker 29.

When the range oscilloscope operator operates the phase shifter 19 in order to select an echo signal on his oscilloscope screen, he also selects that single echo in the meter circuit, since the input of the echo-selecting pulse generator 22 is connected to the output of the phase shifter 19 by a conductor 23. The period of the sinusoidal wave generated by the master oscillator 18 is many times longer than the duration of the transmitted pulse and the duration of the echo pulse, the latter two being substantially equal. It becomes necessary, therefore, to reshape the sinusoidal wave input in the echo-selecting pulse generator 22, so that the period of the pulse delivered by this unit is equal in width to the transmitted pulse. Moreover, this unit is equipped with a phase-shifting network for the initial phasing of the transmitter pulse with the meter circuit. With these requirements satisfied, the echo-selecting pulse generator delivers a strong positive pulse to the meter amplifier 24 which renders this amplifier conductive for only a short period of a single echo pulse selected by the range operator. All other signals are blocked.

The input to the meter amplifier 24 is connected to the output of the receiver 16 by a conductor 25. It will, therefore, receive signals from both radio channels 13 and 14. Since the function of the meter tracker is to indicate, by means of a meter, the difference in signal strength in these two channels, it is necessary to separate the two channel signals, amplify them, and apply them to some form of a differential circuit. The separation of these signals is accomplished by means of an electronic switch within the meter amplifier 24. This switch, consisting of two thermionic tubes with parallel input circuits, is synchronized with the switching of the receiver channels by means of square-wave amplifier and inverter 26, the input of which is connected to the multivibrator 15 by a conductor 27. It will be recalled that the multivibrator 15 keys the R. F. channels 13 and 14. The square-wave amplifier and inverter 26 amplifies the square-wave input, and transforms it into two square waves 180° out of phase with each other. One of these square waves is impressed on the grid of one tube, and the other square wave is impressed on the grid of the other tube of the electronic switch within the meter amplifier and synchronizer 24, which renders these tubes alternately conductive and nonconductive in synchronism with the antenna lobe switching. This synchronous switching accomplishes the separation of the two channel signals in the meter circuit, and these separated channel signals are subsequently utilized in a pulse-averaging circuit, the output of which is connected to a meter 28 and to an automatic antenna tracker 29.

Figure 2:
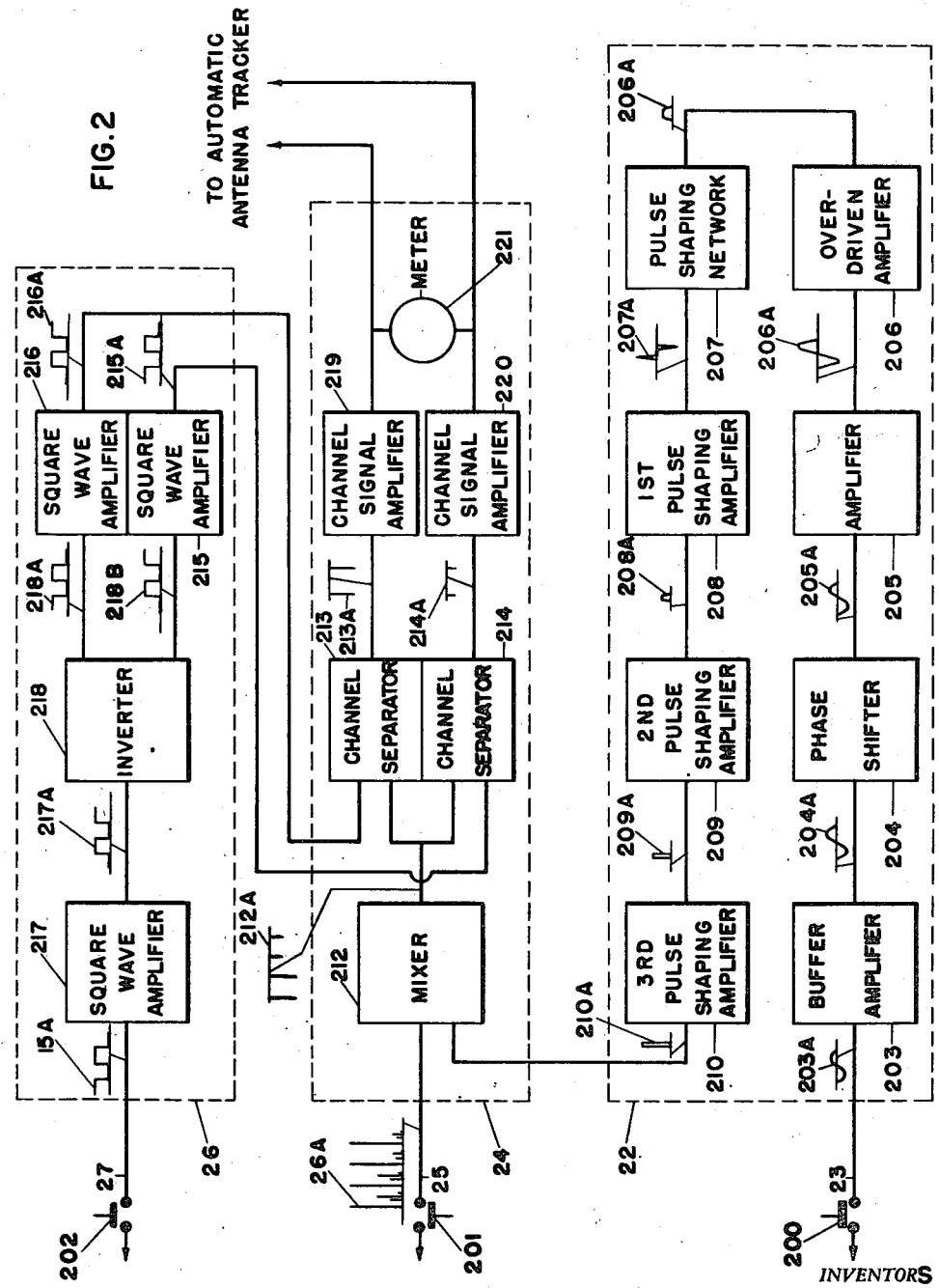
Fig. 2 is a more detailed diagram of the meter tracker alone, with the main components of the receiver and automatic antenna tracker omitted.

A more detailed block diagram of our meter circuit 21 is shown in Fig. 2.

*Detailed block diagram of meter circuit*

Referring to Fig. 2, the output of phase shifter 19, Fig. 1, is connected by a conductor 23, Fig. 2, to echo-selecting pulse generator 22, and more particularly to a buffer amplifier 203 which acts as an impedance matching device and as an amplifier. Sinusoidal wave output of the buffer amplifier is impressed on phase shifter 204 which is used for the initial phasing of the meter with the transmitter. The output of phase shifter 204 is connected to amplifier 205 which is used to further amplify the sinusoidal wave so as to impress a very strong grid signal on overdriven amplifier 206. Approximately square wave 206—A, appearing in the output of this amplifier, is impressed on pulse-shaping condenser-resistance network 207. An adjustable resistance element included in this network is used to control the width of the pulse impressed on the grid of the first pulse-shaping amplifier 208. Square wave 206—A is transformed into two peaked pulses 207—A of positive and negative value in the condenser-resistance network, and the positive peak of this pulse is amplified and slightly reshaped in the 1st, 2nd and 3rd pulse-shaping amplifiers 208, 209 and 210, the output signal of the latter being a substantially square wave 210—A, the duration of which is equal to the duration of the single-transmitted pulse or the echo pulse.

This square wave is impressed on mixer 212 in meter amplifier and synchronizer 24, and is utilized to unblock meter unit 24 only for the duration of this square-wave signal. Mixer 212 is also connected to the output of receiver 16, Fig. 1, but, out of a plurality of the transmitter-echo signals impressed on it by the receiver, only one echo signal selected by the operator of phase shifter 19, Fig. 1, can get through, the remaining signals being blocked by a strong negative bias potential normally impressed on this unit. This bias potential is overcome by the strong positive signal 210—A from 3rd pulse-shaping amplifier 210. Accordingly, the signals appearing in the output of the mixer will consist of a series of the same echo signal, first from one R. F. channel 12, and then from another channel 13. This is shown at 212—A. The number of signals appearing in one series will depend on the frequency ratio of master oscillator 18 and multivibrator 15, Fig. 1.

In order to separate the signals from these channels, the output of mixer 212 is connected in parallel to channel separators 213 and 214, which are rendered alternately conductive and nonconductive by the square-wave amplifiers 215 and 216 in a manner previously described in connection with the description of Fig. 1.

Square-wave amplifiers 215 and 216, along with amplifier 217 and inverter 218, form square wave amplifier and inverter unit 26. This square wave amplifier and inverter unit 26 is connected to multivibrator 15, as shown in Fig. 1. The wave forms of these elements are shown in Fig. 2 and are self-explanatory.

The output of channel separators 213 and 214 are connected to channel signal amplifiers 219 and 220 which integrate the incoming pulses in the condenser-resistance networks, amplify the integrated signal, and impress it on differential meter circuit whose reading is zero when the output of elements 219 and 220 is equal, as previously described in this specification.

*Schematic diagram of the meter circuit*

Figure 3:
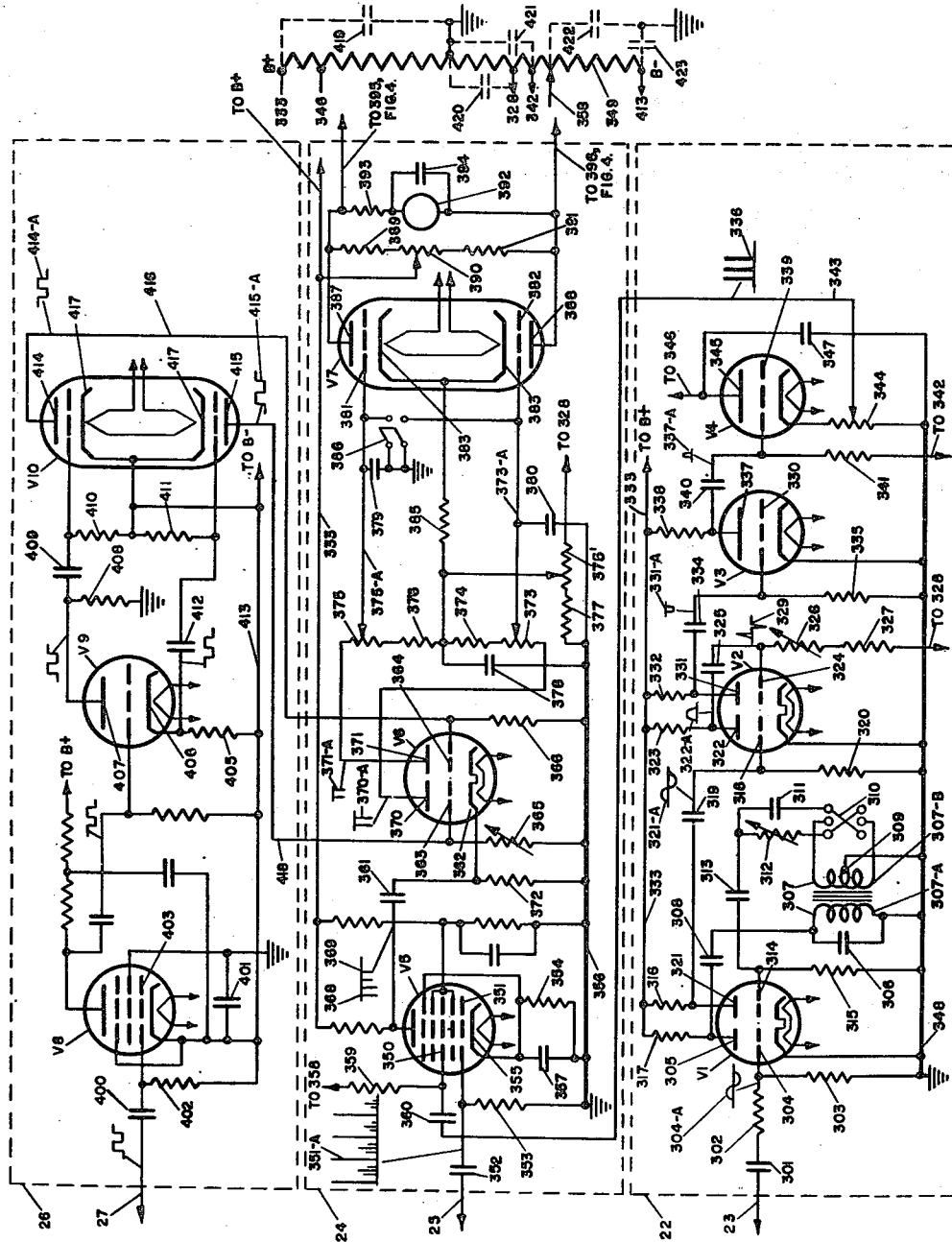
Fig. 3 is a schematic circuit diagram of the meter tracker.

Referring to Fig. 3, the dotted lines designate the same three main elements 22, 24, and 26, shown in Figs. 1 and 2. The conductors 23, 25, and 27 connecting those elements to the receiver, also appear in all three figures.

*Echo-selecting pulse generator (Fig. 3).*—Referring to echo-selecting pulse generator 22, the sinusoidal wave from phase shifter 19 is impressed on the following circuit: conductor 23, condenser 301, resistances 302, 303, ground at resistance 303, and to ground in the phase shifter. Bias on grids 304 and 314, and the intensity of signal input are so adjusted that both stages of twin amplifier VI operates as substantially linear amplifiers. Plate 305 is coupled by condenser 308 to condenser-inductance combination 306, 307—A which are tuned to the sinusoidal wave produced by master oscillator 18, Fig. 1; this tuned circuit presents a high impedance to any harmonics which may appear in plate 305 circuit if tube VI accidentally becomes slightly overdriven. Inductance 307—A forms the primary winding of transformer 307, secondary 307—B of which is grounded through center tap 309. Secondary 307—B is connected to double-pole, double-throw switch 310 which is used to reverse the connections between the secondary and condenser-resistance combination 311—312. By varying resistance 312 it is possible to obtain a phase shift in the sinusoidal wave in the order of 170°, and, by reversing switch 310, it is possible to shift the phase an additional 180°. This phase shifter is used for proper initial phasing of meter circuit with the transmitted signal, as described more fully under "Adjustment of Meter Tracker."

The phase shifter is connected to grid 314 of the second stage of twin amplifier VI through condenser 313 and grid resistor 315. This stage is also a linear amplifier, its output being coupled to grid 318 of the second twin amplifier V2 through condenser 319 and grounded grid resistor 320. The input circuit of grid 318 is so adjusted that the average bias potential of this grid, with normal signal input, is equal to cut-off potential of this tube, and the input signal is such that the tube is driven to saturation on positive halves of the sinusoidal wave. The shape of plate 322 output, therefore, has an approximate form shown at 322—A. Plate 322 is connected to a common +B supply through resistor 323, and to grid 324 input circuit comprising coupling condenser 325, variable resistance 326 and fixed resistance 327, the latter being connected to conductor 323 which impresses a normally negative cut-off bias on grid 324. The time constant of this input circuit is such that wave form 322—A is transformed into a grid signal 329 having positive and negative peaked pulses. The width of this pulse may be controlled by adjusting variable resistance 326. The positive pulse on grid 324 overdrives the second stage of twin triode V2 so that it appears as a trapezoidal signal on grid 330 of the second-shaping amplifier tube V3. Plate 331 of the tube V2 is connected to +B supply through plate resistor 332 and conductor 333, and to grid 330 of tube V3 through coupling condenser 334. Grid 330 is grounded through grid resistor 335, the latter being instrumental in producing linear operation of tube V3. The second stage of tube V2, tubes V3, and V4 comprise three stages of condenser coupled overdriven pulse-shaping amplifiers which transform grid signal 329 into square positive voltage wave 335 in the cathode output circuit of tube V4. Plate 337 of tube V3 is connected to plate supply conductor 333 through plate resistor 338, and to grid 339 of tube V4 through coupling condenser 340. Grid 339 is normally biased to a cut-off potential through grid resistor 341 and conductor 342.

In order to secure an adjustable positive output signal in conductor 343 a potentiometer type of connection is employed between conductor 343 and cathode output resistor 344. Plate 345 is directly connected to a positive voltage supply through conductor 345; it is also connected to grounded conductor 346 by a by-pass condenser 347. All cathodes of the tubes used in the echo-selecting pulse generator are directly connected to grounded conductor 348. The plate and bias voltage are furnished by bleeder resistor 349 which is connected across a filter circuit of an appropriate rectifier (not shown) furnishing the necessary power supply. The necessary conductors for connecting different parts of bleeder resistor 349 with the corresponding conductors in the circuits are indicated by the same numerals.

From the description of the echo-selecting pulse generator 22, it follows that the sinusoidal wave 304—A generated by master oscillator 18 and impressed on grid 304 in this unit, is transformed into a series of uniformly spaced rectangular pulses 336, the width of these pulses being equal to the width of the transmitted pulses and to the width of the individual echo signals. By varying potentiometer 326 setting, this pulse may be made wider or narrower than the transmitted or echo pulses, and, by varying conductor 343 connection on resistor 344, the amplitude of this pulse may be either increased or decreased. This amplitude is normally adjusted so as to slightly more than neutralize the negative bias applied to grid 350 of mixer tube V5 in the meter circuit. Moreover, the phase of the rectangular pulses 336 may be shifted by varying potentiometer setting 312 approximately 180°, and an additional 180° by operating switch 310. The use of all adjustments outlined above is explained under "Adjustment of the Meter Circuit," that is given subsequently in this specification.

*Square wave amplifier and inverter (Fig. 3).*—
The inverter is connected to a multivibrator 15 by conductor 27, coupling condensers 400, 401 and grid resistor 402. The input circuit from multivibrator, therefore, is: multivibrator 15, conductor 27 (Fig. 1), condenser 400, grid resistor 402, condenser 401, to grounded terminals at inverter 26 and multivibrator 15. This input circuit is connected to control grid 403 of pentode V8, where the square wave is amplified and impressed on a second amplifier tube V9. With the connections as shown in this figure, cathode 406 is operated at a potential below ground, and plate 407 is connected through resistor 408 to ground. However, plate 407 may be connected to a higher potential point on bleeder 349, such as conductor 333, so that full available voltage is impressed on this plate. The output of V9 is connected to a twin triode V10, the upper triode of which is coupled to the plate output of V9, and the lower triode of which is coupled to cathode resistor 405. With plate 407 grounded through resistor 408, a circuit through condenser 409 is as follows: grounded resistance 408, condenser 409, resistor 410, conductor 413, condenser 401 in the cathode-screen grid circuit of tube V8 and ground. When plate 407 is connected across full voltage supply, it becomes necessary to shunt the upper part of bleeder 349 with condenser 419 to avoid the appearance of the square wave in the bleeder. Tube V10 is overdriven by the signal output of triode V9. Twin triode V10 amplifies the square waves still further, and, since one of its grids is connected to plate 407 and another to cathode 406, the two square waves 414—A and 415—A appearing in its plate outputs are 180° out of phase. These square waves are used for commutating or keying electronic switch V6 in meter amplifier and synchronizer 24, and since they must produce negative grid pulses in this electronic switch, plates 414 and 415 must be operated at ground potential which is the cathode potential in the electronic switch. The circuit of plate 414 is conductor 416, grid resistor 366, conductor 356 to ground, lower part of bleeder 349 to negative side of the bleeder, conductor 413, and cathode 417. The circuit of plate 415 is the same as that of plate 414, but through conductor 418 and adjustable grid resistor 365.

The operation of electronic switch V6 will be explained more fully in connection with the description of meter circuit 24.

The square waves 414—A and 415—A generated by unit 26 are obviously synchronous with the keying of radio channels 13 and 14, and the period of these waves is equal to the period of the waves generated by multivibrator 15. Accordingly, they will key the electronic switch in the meter circuit 24 synchronously with the keying of the radio channels.

Since the multivibrator 15 itself is capable of generating two square waves 180° out of phase, there is no absolute necessity for having unit 26. If this unit is eliminated, then the electronic switch in the meter circuit is connected directly to the multivibrator. The advantage of having an independent square wave inverter unit for the meter tracker resides in the fact that it makes this tracker an independent unit, which can be readily connected and disconnected in the field.

*Meter amplifier and synchronizer (Fig. 3).—* Conductor 25 and coupling condenser 352 connect grid 351 of mixer tube V5 to the output of the receiver 16. The signals impressed on this grid are shown at 351—A. Tube V5, as shown, is a pentagrid mixer amplifier, but any other suitable mixer tube or pentode may be used. Control grid 351 is grounded through grid resistor 353. This grid is biased by cathode resistor 354 connected between cathode 355 and ground conductor 356. Condenser 357 is a by-pass condenser. The second control grid 350 is biased to cut-off potential by bleeder 349 to which it is connected by conductor 358 and grid resistor 359. Grid 350 is also connected to the source of the echo-selecting pulse 336 by conductor 343, and coupling condenser 360. Grid 350 normally blocks tube V5, and the positive signals from the transmitter are not sufficiently strong to overcome the blocking effect of this grid. However, when echo-selecting pulse 336 is impressed on grid 250, its blocking effect is neutralized for the duration of the selected pulse. The effect of this unblocking on the signals coming from the receiver becomes apparent if one compares the signals shown at 16—A with the signals shown at 368—369; only the highest echo signal has been selected in each channel, and the remaining two echo signals as well as the transmitted pulse have been blocked. The output of tube V5 is connected to cathode 362 of twin triode V6 by condenser 361. Since mixer tube V5 is normally non-conductive, the amplified echo signal 351—A appears as a very strong negative pulse at cathode 362 of twin amplifier V6; this cathode input signal renders either the left or the right side of V6 conductive, depending upon the signals impressed on the grids of this tube. Grids 363 and 364 of this twin triode are directly connected to plates 414 and 415 of twin triode V10 on one side, and to ground through grid resistors 365 and 366, resistor 365 being adjustable for equalizing the signals on these grids. Two square-wave signals 414—A and 415—A, which are 180° out of phase and which are synchronized with the alternate switching of R. F. channels 13 and 14, Fig. 1, are impressed on grids 363 and 364, which renders each of the two halves of twin triode V6 alternately non-conductive.

This synchronous blocking of twin triode V6 separates the signals from the two R. F. channels so that echo signals 368 from R. F. channel 13 appear in plate circuit 370, and echo signals 369 appear in plate circuit 371. These signals are shown at 370—A and 371.—A. Cathode 362 of tube V6 is connected to ground through resistor 372, and plates 370 and 371 are connected through resistors 373—374, and 375—376 respectively, and then through resistor 375' to conductor 328 which is adjustably connected to bleeder 349 at a point whose potential is slightly below ground. Accordingly, when there is no signal impressed on cathode 362, this cathode is at a higher potential than the plates, and the twin triode is non-conductive on both sides.

Referring to the plate circuits more in detail, plate 370 circuit is as follows: resistances 373, 374, potentiometer resistance 375', conductor 328, which connects this plate to bleeder 349 at a point which is below the ground potential on this bleeder. Similarly, plate 371 circuit is: resistances 375, 376 potentiometer 375', and conductor 328. Both plate circuits are also connected to ground through potentiometer 375' and resistance 377, the latter resistance being connected to ground by conductor 356. Resistances 377 and 375' are thus connected across the entire negative plate potential impressed by bleeder 349 across conductor 328 and ground; by adjusting the potentiometer connection at 375', it is possible to vary the negative potential impressed on plates 370 and 371. This negative potential is so adjusted that it just suppresses that part of the amplified signal appearing across input resistor 372 which represents the positive excess of the signal on grid 350 in mixer tube V5 produced by the echo-selecting wave 336.

As has been stated previously in connection with the operation of mixer tube V5, the amplitude of the echo-selecting pulse 336 is so adjusted that part of this pulse appears in the output circuit of tube V5. Accordingly, the selected echo pulse per se is superimposed over that part of pulse 336 which is higher than the fixed bias potential impressed on grid 350. Since this transmitted part of pulse 336 would lower the sensitivity by charging integrating capacities 379 and 380, it must be suppressed in the circuit of tube V6. This is done by adjusting the negative plate potential 375' so that it is completely suppressed in this tube, and does not appear any more in the meter circuit connected to the output of this tube. Condenser 378 is a by-pass condenser which offers a low impedance path from the plates output V6 to cathode resistor 372, so that this output signal does not appear in the resistances 375' and 377.

From the above description of the operation of tube V6 it follows that it acts as an electronic switch or an electronic commutator which receives a series of echo signals first from one radio channel, and then a series of the same echo signals from another radio channel. Tube V6, with the assistance of echo-selecting pulse generator 22, separates these two series of channel signals so that each series appears in an independent output circuit after they pass through this tube. These signals, if the integrating effect of the associated circuits is disregarded, would appear as shown at 370—A and 371—A.

Condensers 379 and 380 are connected to grids 381 and 382 respectively, on one side, and to ground on the other side. Since the junction point of resistors 376 and 374 is grounded through condensers 378, it follows that each of these condensers is connected directly across the plate output resistors in their respective channels. Accordingly, each condenser will bear a charge proportional to the average voltage drop in the plate resistor across which it is connected, and the voltage produced by this charge will be impressed on a balanced direct-current vacuum tube voltmeter V7. Grids 381 and 382 of tube V7, which is a twin triode tube, are directly connected to condensers 379, 380, and to resistors 375, 373. The resistors connections are adjustable so that the voltmeter input circuit may be so balanced that when the signal intensities in the two input channels are equal, the plate currents in twin triode V7 are also equal. Cathode 383 is connected to a common cathode bias resistor 385, the latter being connected on the other side to a conductor connecting resistances 374 and 376. Condensers 379, 380, resistor 385, and resistors in the plates of tube V6, are so chosen that the time constant of this circuit is relatively large, and the biasing of tube V7 is fixed so that it acts as a linear amplifier of the signals appearing across the integrating condensers. The bias potential on grids 375', 381 and 382 is not affected by adjustment of potentiometer 375' because cathode 383 and grids 381 and 382 of tube V7 are both returned to the arm of potentiometer 375'. Therefore, potentiometer 375' is used to adjust the negative bias potential on the plates of tube V6 without affecting the bias on tube V7. Cathode 383 is at a slightly lower potential than ground, since they must be directly connected to the output circuit of tube V6 in order to obtain direct current amplification in tube V7. The input circuit of tube V7 may be short-circuited by operating switch 386. The purpose of this switch will be explained later under "Adjustment of Meter Tracker." Plates 387, 388 are connected to a source of positive potential by conductor 333 through resistors 389, 391 and 390, the latter resistor having a potentiometer type connection so that the plate currents can be made equal when no input signals are impressed on grids 381, 382.

Meter 392, which may be, for example, a high impedance zero center voltmeter, is connected across the output circuit of tube V7. External resistance 393 may be connected in series with this meter if it is desired to increase the impedance of the meter connection so that it will not produce a shunting effect in this output circuit. This becomes especially desirable when the output circuit of tube V7 is utilized not only for meter tracking, but for automatic antenna tracking as well, as is the case here. Conductors 395 and 396 are connected to the automatic antenna tracking equipment shown in Fig. 4.

From the above description of the meter tracker it follows that when the integrating capacitors 379, 380 are equally charged, the meter tracker will read center scale zero. However, if one capacitor is charged more than the other, the meter will read to the left or to the right of the zero center scale, depending upon the orientation of the antenna array with respect to the target. The center scale zero reading indicates that the amplitude of the echo signals in the two radio-frequency channels is equal. This is so when the antenna array is pointed directly at the echo-producing object. A reading to the left or to the right of the zero center indicates not only the direction in which the antenna should be turned, but also gives an approximate indication of the degree of the antenna deviation at any given time.

Some of the advantages of the meter tracking may be summarized as follows: Because of the use of the electronic switch, the channel components of the echo signal are separated and appear in the output circuit of the electronic switch as two independent series of signals. These signals, separated according to their derivative channels, are impressed on condensers 379—380, which perform the important integrating function before the signals are impressed on the meter itself. The time constants of the meter tracker circuit are of such value that an overwhelming majority of the echo signal fluctuations described in the beginning of this specification are completely damped. This results in a substantially smooth variation in meter reading when the selected echo-producing object is being tracked. The degree of this damping may be varied and made very high if desired. Moreover, since the damping or integrating of the components is accomplished after their separation by the electronic switch, this damping is not accomplished at the expense of the average sensitivity of the meter circuit. This even flow of the orientation data is very desirable for an accurate, continuous tracking of the fast-moving objects. Meter tracking is less fatiguing on the operator since meter reading refers to the selected echo-signal only, and all other extraneous signals which ordinarily appear on the oscilloscope screen are completely eliminated; moreover, there is no possibility of temporary blindness created by a sudden, extreme change between the illumination on the oscilloscope screen and daylight. The operator is allowed more freedom to move around than if he were looking into an oscilloscope hood, and, finally, the output of the meter tracker could be used for automatic antenna tracking, as described later in this specification.

*Adjustment of meter tracker*

The transmitter 30 and receiver 10, Fig. 1, are started and put in operation.

Meter tracker 21 may or may not have a switch connecting it to the receiver. Fig. 2 shows three switches, 200, 201 and 202, which connect meter tracker to the receiver, but these switches are not essential and may be replaced with ordinary plug connections between receiver 10 and meter tracker 21. If the meter is provided with the switches, they are closed, and the meter circuit adjustments are made in the following order: The first meter tracker adjustment is concerned with the equalization of the square-wave signals impressed on grids 363 and 364 of tube V6, comprising the electronic switch. This adjustment is performed by connecting oscilloscope deflection plates between grid 364 and ground and observing the shape, width and amplitude of one square wave. The same procedure is used in connection with grid 363, and the amplitude of the observed wave is adjusted by varying resistance 365 until the two waves have equal amplitudes.

The second adjustment is concerned with the adjustment of the grid bias potential on grid 350 of tube V5. It may be recalled that this potential is adjusted so that it is slightly less but opposite in polarity to the potential impressed on grid 350 of the same tube by square wave 336. The two potentials may be compared by direct measurement of the negative bias potential with a D. C. voltmeter, and by measuring the second potential with a peak voltage meter, and comparing the two readings. The peak voltmeter reading should be slightly higher than the reading obtained with the D. C. voltmeter and positive in polarity; if it is not, then the position of conductor 358 on the bleeder is adjusted until this is the case. Another method of adjusting this blocking potential on grid 350 may be accomplished by connecting an oscilloscope in the output circuit of tube V5, impressing the maximum expected signal from receiver 16 on grid 351, and adjusting the position of conductor 358 on bleeder 349 so that this signal just disappears on the oscilloscope screen.

The third adjustment consists of balancing meter centering resistance 390. Switch 386 is closed and the input circuit of twin triode V7 is thus short-circuited. Meter-centering potentiometer connection at resistance 390 is then used to electrically center the meter. After centering the meter the switch is placed in the open, or operating position.

The next adjustment is concerned with the proper phasing of the meter with the transmitter channel, and more particularly, with the transmitted signal. Equipment in the transmitter and the receiver channels introduce different phase shifts, and these must be nullified by properly adjusting phase shifter 204, Fig. 2, or elements 312, 310, Fig. 3 in the meter circuit so that keying of the meter circuit by square wave 336 is in phase with the transmitted signal as it appears on grid 351 of mixer tube V5. This phasing adjustment is accomplished as follows: Phase shifter 19 (Fig. 1) is adjusted so that the transmitter pulse is under the hairline on all three oscilloscopes, i. e. range, elevation and azimuth oscilloscopes. The input circuit of tube V7 is unbalanced by sliding conductor 375—A up on resistance 375, and by sliding conductor 373—A up on resistance 373. This adjustment increases the signal on grid 381 by including the entire resistor 375 in the input circuit, and decreases the signal on grid 382 by completely eliminating resistor 373 from the input circuit of this tube. The receiver gain is now turned down far enough to eliminate all but the transmitted pulse from the receiver output. The phasing adjustment resistance 312 is then adjusted for maximum deflection on meter 392. When this is so, then the transmitted signal as it appears on grid 351 will be in phase with the keying wave 336 since the entire transmitted signal can get through mixture tube V5 only when there is a complete phase coincidence between the two signals. During this adjustment it may be found that no proper phase relationship can be obtained by adjusting resistor 312. If this happens, then it means that the units are more than 170° out of phase, and operation of phasing switch 310 may be necessary in order to obtain a greater phase shift from this unit.

Adjustment of plate bias potentiometer 375' is the next adjustment. Phase shifter 19 is now adjusted so that no signal appears under the oscilloscope line. After this has been done the plate bias potentiometer 375' is adjusted so that meter 392 is just about ready to move off the center zero position. This adjustment impresses a sufficiently negative bias on plates 370 and 371 of tube V6 so as to suppress that part of echo-selecting pulse 336 impressed on tube V5 which gets through this tube.

Balance of the input resistances 375 and 373 is the last adjustment. The receiver gain is now turned up to bring in the echoes. Phase shifter 19, Fig. 1 is adjusted to bring in under the range oscilloscope hairline an echo signal, and, by using the spread control (varying the amplitude of square wave 15—C) and the resulting double images on the elevation and azimuth oscilloscopes as indicators, the antenna is oriented until the amplitudes of the signals are equal. The potentiometer arms 375—A and 373—A are then set so as to include resistances 375 and 373 in the input circuits of grids 381 and 382, i. e. they are adjusted for maximum signal input. If after this adjustment is made the meter does not read zero, one of the potentiometer settings is reduced until it does.

The meter tracker is now ready for operation.
The adjustments outlined above can be made out in the field, or "on the bench," while the radio receiver is being aligned. Once the meter circuit is adjusted in connection with any particular transmitter-receiver combination, the meter circuit should normally remain in a balanced condition and ready for an instantaneous use on any subsequent occasions without any additional preliminary adjustments.

*Summary of the operation of the meter tracker*

The operation of the meter tracker has been described in detail already; therefore, only a brief summary of its operation will be given here.

The meter is particularly adapted for use with pulse-echo systems which utilize the double-tracking method for obtaining the location of an object. Two series of the transmitted and the echo signals are impressed on the meter circuit, one series coming from one lobe of the antenna, and another series of signals from another lobe. These signals are shown at 13—A and 14—A, Fig. 1. The signals from the two receiver channels are impressed on the meter amplifier and synchronizer circuit 24 where all signals except the selected echo signals are suppressed, as shown at 212—A, Fig. 2. Because of the double-tracking method used at the receiver these selected echo signals appear in the meter circuit 24, Fig. 2, as a series of signals first from one antenna scanning channel, and then from another antenna scanning channel, as shown at 212—A, Fig. 2. These signals from different channels are separated by channel separators 213, 214, Fig. 2, and are utilized to operate a balanced direct current vacuum tube voltmeter 221 connected in its output circuit. This meter indicates the amount and the direction of deviation of the antenna array from the echo-producing object, and is used as a visual indicator for aiding in directing the azimuth or the elevation antenna arrays at the object.

*Automatic antenna tracker*

The schematic diagram of the automatic antenna tracker is shown in Fig. 4. Conductors 395 and 396, shown in Fig. 3 as being connected across the output circuit of the tube V7, also appear in Fig. 4. These conductors are connected to switches 501—503 and 502—504. The action of these switches is such that when switches 501 and 502 are open, switches 503 and 504 are closed, and vice versa, and switches 503 and 504 must open before switches 501 and 502 close. Switches 501 and 502 are used to connect and disconnect the meter circuit to the automatic antenna tracker. Conductors 505 and 506 represent two potentiometer arms which connect switches 503 and 504 to their respective potentiometers 507 and 508. These potentiometer arms are each connected to a set of adjustable springs 509—510 and 511—512 which normally keep the potentiometer arms at those points which render grids 513 and 514 of vacuum tubes VII and VI2 normally at zero-bias, or at slightly negative bias. A bleeder resistor 515 supplies plate potential for plates 516 and 517 of tubes VII and VI2 and the bias potential for the potentiometers 507 and 508. The action of the above springs is such that irrespective of the position of the arms 505—506 when they are released by the operator after the manual operation of them, they always come back to the same positions on their respective potentiometers. These positions are adjusted so that there is an equal plate current in the tubes VII and VI2. The potentiometer arms are connected to a manually operated wheel 534 which operates them simultaneously but in the opposite directions, i. e. when arm 505 is moved to the negative end of potentiometer 507, arm 506 is moved to the positive end of potentiometer 508, and vice versa.

The input circuit of tubes VII and VI2 may be connected to the output of the meter circuit by closing switches 501—502 and by opening switches 503—504. When this is done, the grid resistors 518 and 519 are connected in parallel with meter 392, Fig. 3, and any direct current voltage which appears across meter 392 and resistance 393 also appear across grid resistors 518 and 519. Cathodes 520 and 521 of tetrodes VII and VI2 are connected to such a point on bleeder 515 which will furnish sufficient cathode-to-plate potential for proper operation of the tetrodes. The screen grids 522 and 523 may be connected directly to the positive side of bleeder 515 without any resistance in their circuits. The plates of the tetrodes are connected to the differential control field windings 524 and 525 of an "Amplidyne" set 526, driven by a motor 527. Although the automatic antenna tracker is illustrated by way of example in connection with an "Amplidyne" set, it should be understood by those skilled in the art that any other torque amplifying means may be used.

The output of the "Amplidyne" set 526 is connected to a direct current motor 528 which is connected by shaft 529 with gear box 530, and the latter is connected through an appropriate shaft 531 or chain transmission with the antenna array 532. The same antenna array is shown in Fig. 1 at 11 and 12. This array may be either an azimuth or an elevation array, the "Amplidyne" set connected to the azimuth receiver drives the azimuth antenna array, and an identical set connected to the elevation receiver drives the elevation antenna array.

The adjustment of the automatic antenna tracker, which is identical for the azimuth as well as the elevation antenna arrays, is as follows: the "Amplidyne" set is started by closing a switch (not shown) to power supply of motor 527 which drives the "Amplidyne" set. At this time switches 501—502 and 503—504 are open. Before switches 501—502 are closed the meter circuit must be balanced, as described under "Adjustment of Meter Tracker," so that meter 392 in Fig. 3 reads zero with no signal impressed on its circuit. If there is a danger of sudden signals being impressed on the antenna arrays 11—12 shown in Fig. 1, switch 386, Fig. 3 may be closed so as to short-circuit the input into the meter circuit. Thus, with no signal impressed on conductors 395 and 396 from the meter circuit, switches 501—502 are closed after connecting tubes VII and VI2 to their power supplies. The output of tubes VII and VI2 is then adjusted at potentiometer connection 533 so that antenna tracking motor 528 remains stationary. Switches 501—502 are then opened, switches 503—504 closed, and the springs of the potentiometer arms 505—506 balanced so that motor 528 remains stationary. This correctly adjusts the automatic antenna tracker for operation from the meter circuit shown in Fig. 3.

The actual operation of the systems of this kind discloses that there is ordinarily a plurality of echo signals in the antenna field so that the visual picture found on the range oscilloscope appears as it is shown in Fig. 5. This has been previously discussed under that section of this specification which deals with the "Receiver." It has been also stated in that section of the specification that the range oscilloscope operator selects a single echo signal by turning the wheel of phase shifter 19, (Fig. 1) until the desired echo signal (echo #7, Fig. 5) is positioned either under or next to the hairline of the range oscilloscope, as shown in Fig. 6. This positions the same signal under the hair lines of the azimuth and the elevation oscilloscopes. When this is accomplished, the azimuth and the elevation oscilloscope operators must turn their respective antenna arrays quickly so that the amplitudes of the split images (Fig. 7) are equalized, as shown in Fig. 8.

From the above description of the operating cycle, which precedes the automatic antenna tracking, it follows that there are two distinct phases in the preliminary orientation of the system before the automatic tracker may be profitably connected to the system. The first phase consists of the selection of the desired echo signal by the range operator. The second phase consists of a quick orientation of the azimuth and elevation antenna arrays to equalize the split images. During the first phase the automatic tracker must remain disconnected, because shifting of the echo signals on the oscilloscope screens during the echo-selecting period may impose very strong loads on the "Amplidyne" sets when the undesired echo signals pass under the hair lines of the oscilloscopes and when they are impressed on the meter circuits. These strong loads would be transmitted to the antenna arrays in a form of greatly amplified torques and may produce a mechanical injury of the system. At this stage the meter-tracker circuit may remain connected without any injury to the meter 392, but switches 501—502 must remain open.

During the second phase of the preliminary orientation of the system, the difference in the signal amplitudes (Fig. 7) may be so large that an immediate closing of the antenna tracker switches 501—502 may again result in an unduly large mechanical stress imposed on the mechanical structure of the systems. To avoid this switches 503—504 are closed first, and the control wheel connected to the potentiometer arms 505—506 turned from its normally neutral position in such a direction as to equalize the amplitude of the images on the oscilloscope screens, as shown in Fig. 8. When this control wheel is turned, the normal balanced condition of tubes VII and VI2 is destroyed, and if grid 513 is rendered more positive by shifting of the potentiometer arm 505 on potentiometer 507 toward the positive end of this potentiometer, then grid 514 is rendered negative by the simultaneous shifting of potentiometer arm 506 toward its negative end. This results in an increase in the plate current of tube V11, and a decrease in the plate current of tube V12, with the corresponding changes in the currents carried by the differential field windings 524 and 525 of the "Amplidyne" set 526. The amplified power generated by the "Amplidyne" set is impressed on the antenna tracking motor 528, which turns the antenna array in the direction which points it directly at the echo-producing object through gear box 530 and shaft 531.

With the antenna array pointed substantially at the target, switches 503—504 are opened and switches 501—502 are closed. This last operation transfers the antenna-tracking control from the manually operated wheel connected to the arms 505—506 to the completely automatic antenna tracking by connecting the "Amplidyne" unit to the output circuit of the meter-tracker unit. As has been described previously in this specification, the D. C. potentials appear across the resistances 389 and 391, Fig. 3, which are substantially proportional to the peak voltages of the images shown in Figs. 7 and 8. This same voltage is impressed on the D. C. linear amplifier V11—V12, field windings 524 and 525, and antenna tracking motor 528 in its amplified form, this motor turning the antenna array so that its plane is parallel to the wave front of the echo signal.

The automatic tracker may be disconnected at any time by opening switches 501—502.

From the above description of the automatic antenna tracker, one may very readily see that its operation is completely automatic when switches 501—502 are closed, and the speed of antenna tracking motor 528 depends on the difference in the intensity of the echo signals derived through their respective channels. As this difference in intensity increases, so does the speed of the motor increase. When switches 501—502 are open and switches 503—504 are closed, it is possible to rotate the antenna array at any desired speed by manipulating the potentiometer arms 505—506. The greater is the unbalance created by shifting these arms from their normally neutral position, the greater is the speed of the antenna-tracking motor.

Although we have illustrated preferred forms for carrying out our present invention, it is to be understood that modifications are feasible and we do not intend to be limited except as set forth in the following claims.

What we claim is:

1. In a radio pulse-echo object-locating system capable of comparing components of an echo signal derived through separate receiving channels, means for suppressing all but the desired echo signal, and an electronic switch for separating the components of said signal according to their derivative channels, said electronic switch comprising two triode units with a common cathode connection to ground through a cathode resistance, and a coupling means between said first means and said cathode resistance whereby said echo signal renders said cathode negative with respect to ground.

2. In a radio pulse-echo object-locating system capable of comparing the channel components of an echo signal derived through separate receiving channels as in claim 1, wherein said electronic switch further comprises two parallel output circuits connected to two plates of said triode units, and a source of potential interconnecting said output circuits and said cathode, the negative terminal of said source being connected to said output circuits, and the positive terminal to said cathode, said source acting as a plate-biasing potential for said triode units.

3. In a radio pulse-echo object-locating system capable of comparing the channel components of an echo signal derived through separate receiving channels as in claim 1, wherein said electronic switch further comprises two output circuits connected to two plates of said triode units, and two control grids, each of said grids being connected to a source of periodically varying potential rendering each side of said triode units alternately conductive, whereby said channel components of said echo signal derived through one channel appear in one output circuit of said triode units, and said channel components of said echo signal derived through the other channel appear in the other output circuit of said triode units.

4. In a radio pulse-echo object-locating system capable of comparing components of an echo signal derived through separate receiving channels, means for suppressing all but the desired echo signals, and an electronic switch for separating the components of said signal according to their derivative channels, said electronic switch comprising two triode units with a common cathode connection to ground through a cathode resistance, a coupling means between said first means and said resistance, two ground-through resistors control grids, and two sources of rectangular periodic voltage pulses 180° out of phase with respect to each other and in phase with said components of said signal, one of said sources being connected to one of said grids and the other source being connected to the other grid, whereby said channel components of said echo signal derived through one channel appear in one output circuit of said triode units, and said channel components of said echo signal derived through the other channel appear in the other output circuit of said triode units.

5. An electronic switch comprising two triode units having a common cathode connection, two grids and two anodes, a resistor grounding said cathodes, a source of intelligence signals having two signal components, said source being connected to said cathodes, a resistance connected between ground and each of said grids, a source of rectangular waves, a first push-pull amplifier connected to said source of rectangular waves said amplifier having first and second anodes, said first anode being metallically connected to one grid and said second anode to the other grid of said triode units, whereby said amplifier renders said grids alternately negative with respect to said common cathode, an output resistor connected across the plates of said triode units, the midpoint of said output resistor being connected to the negative end of a source of potential, the positive terminal of said source being connected to ground whereby said source negatively biases the plates of said triode units with respect to its cathode, a second push-pull amplifier, the grids of said second push-pull amplifier being metallically connected across said output resistance, and a connection between the cathodes of said second push-pull amplifier and said mid-point on said output resistor, said rectangular waves alternately making one of said triode units non-responsive and the other responsive to said intelligence signals.

WILLIAM A. HUBER.
WILLIAM T. POPE, Jr.

(References on following page)

REFERENCES CITED

The following references are of record in the file of this patent:

UNITED STATES PATENTS

| Number | Name | Date |
|---|---|---|
| 1,924,174 | Wolf | Aug. 29, 1933 |
| 2,189,317 | Koch | Feb. 6, 1940 |
| 2,312,203 | Wallace | Feb. 23, 1943 |
| 2,403,975 | Graham | July 16, 1946 |
| 2,417,248 | Godet | Mar. 11, 1947 |
| 2,420,334 | White | May 13, 1947 |
| 2,421,663 | Tolson | June 3, 1947 |
| 2,427,029 | Stearns | Sept. 9, 1947 |
| 2,436,655 | Locke | Feb. 24, 1948 |

FOREIGN PATENTS

| Number | Country | Date |
|---|---|---|
| 113,233 | Australia | June 2, 1941 |